United States Patent Office 3,227,542
Patented Jan. 4, 1966

3,227,542
METHOD FOR CONTROLLING PLANT GROWTH
Abraham N. Kurtz, Charleston, W. Va., and Richard A. Herrett, Raleigh, N.C., assignors to Union Carbide Corporation, a corporation of New York
No Drawing. Filed Apr. 18, 1962, Ser. No. 188,523
19 Claims. (Cl. 71—2.7)

The present invention relates to methods and compositions for influencing and regulating the growth of plants by employing certain 3-haloacrylic compounds.

The compounds contemplated for use in this invention have been found to exhibit broad-range and unusual plant-growth influencing properties and capable of inducing a variety of phytotoxic responses in plants and plant seeds. In one aspect of the invention, total eradication of the treated plant is achieved, while in other aspects a striking selectivity in the activity of the compounds with regard to their effect on various plant tissues has been observed. For example, the compounds used in this invention may be employed to achieve defoliation of plants wherein the chemical selectivity promotes the formation of abscission cells in the leaf petioles of the plant, causing the leaf to fall off while leaving the remainder of the plant unharmed. In other applications the compounds exhibit desiccating action wherein the entire plant leaf is dehydrated and adheres to the stem and thus is not removed while the rest of the plant is unaffected. In still other applications, as has been mentioned above, a non-selective killing or eradication of an entire plant can be achieved, either by pre-emergence or post-emergence application, the former technique normally requiring more chemical. While the various activities of these compounds fall under the general heading of plant-growth regulating action, it should be noted that one activity can in no way be predicted from the other and that each activity renders the compounds valuable in different applications. The varieties of plants that can be treated include cotton; leguminous plants such as beans, peas, peanuts, and soybean; and woody perennials, such as privet or nursery stock, e.g. azaleas or roses, which can be defoliated or desiccated, and weeds such as crabgrass which can be selectively killed.

When it is desired to destroy a plant completely, e.g. in weed-killing, control of crabgrass etc., the amount and manner of application of chemical will obviously be such as to invoke the indiscriminate killing action of the compounds. On the other hand, a more selective action is often desired. For example, when harvested corn is to be stored for extended periods, it is highly desirable to dry out, or desiccate, the corn in order to render it less susceptible to attack by fungi. When harvesting "stripper" cotton where the bolls and the leaves are both removed from the stem, desiccation of the plants prior to harvesting facilitates treatment of the removed crop and avoids chlorophyll stains in the harvested crop. In other applications a pure defoliating, i.e. leaf-removing, action is desired, particularly in the mechanized harvesting of crops, where it has become essential to find chemicals which will defoliate such plants as cotton and leguminous plants, e.g. peas, beans, and peanuts, so that plant leaves do not interfere with effective harvesting. When transporting nursery stock, it is often desired to make handling of the plants less awkward by defoliation of the plants before transport. In transplanting, it is also desirable to remove leaves without killing the plant, thereby reducing transpiration or water loss. This in turn reduces normal transplanting shock.

The compounds capable of producing one or more of the aforedescribed variety of effects according to our discovery are certain 3-haloacrylic compounds.

By the term "3-haloacrylic compound" as used throughout this specification is meant an alpha,beta-unsaturated carboxylic compound having a chlorine, bromine, iodine, or fluorine atom at the double-bonded terminal carbon atom and capable of forming the corresponding 3-haloacrylate anion upon hydrolysis. Generally, compounds usable in this invention thus comprise the structures, (I) 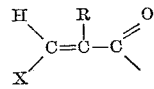

wherein X is chlorine, bromine, iodine, or fluorine, and R is hydrogen or lower alkyl, e.g. alkyl of from 1 to 4 carbon atoms, which structure can be supplied in the form of the free 3-haloacrylic acid or such other carboxylic compounds as are capable of forming the corresponding 3-haloacrylate anion, HXC:CROO—, it having been found that derivaties of the carboxylic acid group retain the activity associated with the characteristic structure of our compounds, although secondary properties which make certain materials more practical for use may be altered.

As illustrative of the 3-haloacrylic compounds utilizable in this invention there can be mentioned, in addition to the free acids, e.g. 3-chloroacrylic acid, 3-bromoacrylic acid, 3-fluoroacrylic acid, and 3-iodacrylic acid, 2-methyl-3-chloroacrylic acid, 2-ethyl-3-chloroacrylic acid, 2-propyl-3-chloroacrylic acid, 2-isopropyl-3-chloroacrylic acid, 2-butyl-3-chloroacrylic acid, 2-methyl (or ethyl or propyl or butyl) - 3 - bromoacrylic acid, etc., inorganic salts of said acids, for example, the alkali metal salts such as those of lithium, sodium, and potassium, which provide derivatives of high water solubility, and the salts of the alkaline earth metals, for example magnesium, calcium, strontium and barium. Likewise for certain applications we prefer the heavy metal salts such as, for example, the salts of nickel, chromium, copper, zinc, silver, mercury, molybdenum, antimony, bismuth, tin, aluminum, manganese, iron and lead.

Other salts of our materials can be formed such as, for example, the ammonium salts, hydrazonium salts and other nitrogen-containing salts, such as salts formed with alkyl, aryl and other organo-substituted nitrogen bases, and amino salts formed with organic compounds having a $NH_2$ group. Examples of such nitrogen-containing groups which form salts with our compounds include trimethylammonium, triethylammonium, phenylammonium, monoethanol-, diethanol- and triethanolammonium salts, dimethylpropylammonium, and tribenzylammonium salts, and amino-heterocycles. Furthermore, forming ammonium salts with high molecular weight organic radicals such as for example the methyl-ethyl-octadecyl-ammonium group, can provide materials having important solubility relationships and surface activity.

In general, nitrogen-containing salts of our growth regulants contain the groupings (A) 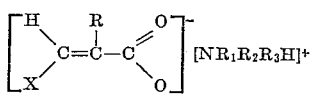

or (B) 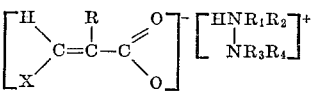

wherein X and R are defined as before and $R_1$, $R_2$, $R_3$, and $R_4$ include hydrogen, alkyl, cycloalkyl, aralkyl, aryl or combinations thereof where the total number of carbon atoms in $R_1$, $R_2$, $R_3$, and $R_4$ is less than about 30, as well as substitution products thereof. Thus, such groups $R_1$, $R_2$, $R_3$, and $R_4$ can be hydrogen, methyl, ethyl, propyl, isopropyl, butyl, sec.-butyl isobutyl, ter.-butyl, the isomeric amyl, hexyl, heptyl, octyl, nonyl, decyl groups, and the like including higher alkyl groups such as stearyl, lauryl, oleyl, octadecyl and the like; cycloalkyl such as cyclobutyl, cyclopentenyl, cyclohexyl and the like and substituted cycloalkyl such as methylcyclopentyl, methylcyclohexyl, dimethylcyclohexyl, isopropylcyclohexyl and the like; aralkyl such as benzyl, α-phenethyl, β-phenethyl, α-phenyl-β-chloroethyl, ar.-chlorobenzyl, ar.-nitrobenzene; aryl groups such as phenyl, α-naphthyl, β-naphthyl, p-diphenyl, o-tolyl, m-tolyl, p-tolyl, o-xylyl, 4-ethylphenyl, α - (2 - methylnaphthyl), o-chlorophenyl, p-chlorophenyl, 2,4-dichlorophenyl, nitrophenyl, acetophenyl and the like. In general, such groups $R_1$, $R_2$, $R_3$, and $R_4$ can contain negative substituents such as halogen, hydroxyl, hydrocarbonoxy, carbonyl, nitro, nitroso, nitramino, amino, substituted amino, hydroxylamino, sulfhydryl, sulfide, imino and the like groups to further modify the primary growth response characteristics with regard to toxicity, volatility, ease of formulation or to produce secondary effects such as penetration and the like. In the amino salts represented by grouping (A) above, wherein $R_1$ and $R_2$ are hydrogen, $R_3$ can also represent a heterocycle such as oxadiazole and triazole radicals as in, for example, the salt of 3-haloacrylic acid and 3-amino-1,2,4-triazole.

Further derivatives of our novel growth regulants comprise the thiouronium salts of the 3-haloacrylic acids.

A similar class of derivatives of our 3-haloacrylic compound growth regulants comprise the organometallic salts. Typical examples of such salt-forming groups which we can incorporate into our growth regulant structure include alkyl-, aryl-, and alkylaryl-metallo groups. Generally, such embodiments conform to the structure (C) 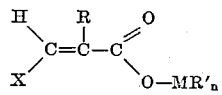

wherein X and R are as before and M is any metal which will form organometallic compounds of suitable stability, $n$ is an integer which is one less than the valence of the metal and R' is one or more hydrogen, alkyl, cycloalkyl, aryl, aralkyl, alkaryl, alkoxy or aryloxy groups or substituted derivatives thereof and combinations thereof and where R' contains, in general, less than 15 carbon atoms. Typical examples of such metals include merucury, tin, lead, antimony, bismuth, arsenic, germanium, aluminum, boron, gallium, silicon, zinc, tellurium and the like. Thus, for example, methylmercuri, phenylmercuri, ethylmercuri, dibenzyltin, diphenyltin, diethyltin, triethyltin, triphenyltin, diphenylgermanium, dibenzylgermanium, triethylgermanium, dimethylphenylgermanium, ethylthallium, diethylsilicon, dimethylsilicon, diphenylbismuth, ethylcadmium, phenylcadmium, dimethylaminophenylmercuri, ethylmercaptomercuri, tolylmercuri, furfurylmercuri, methyltelluri, ethyltelluri, phenyltelluri, trimethyltelluri, dimethylphenyltelluri, dimethylboro, methylphenylboro, dicyclohexylboro, borohydro, boroetherate, dimethyl-p-anisylboro, dimethylarseno, diphenylarseno, methylphenylarseno, dimethylaluminum, diethylaluminum, methylphenylaluminum, ethylzinc, isopropylzinc and methylzinc 3-haloacrylates, and the like, can be prepared and retain the growth regulant characteristics.

In addition to the salt-like derivatives of our compounds, we can employ them in the form of esters. Among the organic esters which we can employ are the alkyl esters such as, for example, methyl, ethyl, n-propyl, isopropyl, butyl and isomeric butyl, amyl, hexyl, heptyl, octyl, nonyl, and decyl esters, as well as the higher aliphatic esters such as stearyl, lauryl, and oleyl, esters; cycloalkyl esters such as cyclobutyl, cyclopentyl, cyclohexyl, esters of the polyethers and polyhydric alcohols such as, for example, esters of pentaerythitol, ethylene glycol, methoxyethanol, ethoxyethanol, butoxyethanol, butoxy ethoxy propanol, polyethylene and polypropylene glycols and the various Carbitols and Cellosolves, such as butyl Cellosolve, and the like. Likewise aryl esters can be employed and in some instances these are preferred. Examples of such esters include the phenyl, tolyl, xylyl, p-diphenyl, ter-phenyl, o-diphenyl, α-naphthyl, β-naphthyl esters and the like. We have also found that by substituting other groups or radicals into such organic esters we can achieve important improvements in the applicability of our materials. Thus, in the alkyl and aryl esters of our compounds enumerated above we can provide the corresponding esters wherein negative groups such as a halogen including chlorine, bromine, fluorine and iodine, or various nitrogen-containing radicals such as nitro, nitroso, amino, substituted amino groups, or sulfur-containing radicals, such as, for example, mercaptyl, substituted mercaptyl, sulfide, sulfonic, sulfonyl and sulfonamide radicals and the mixtures thereof are incorporated therein. Thus we can form the β-chloroethyl, β-bromoethyl, 2-fluoropropyl, 2-hydroxycyclohexyl, β-thiocyanoethyl, β-mercaptoethyl, 4-aminobutyl, diethylaminomethyl, β-dimethylaminoethyl, β-sulfoethyl, and the like, 3-haloacrylates. Likewise p-tolyl, p-anisyl, 2-nitrophenyl, 2,4-dichlorophenyl, pentachlorophenyl, 2,4,5-trichlorophenyl, p-aminophenyl, o-(N,N-dimethylaminophenyl) α-(4-nitronaphthyl), and the like, 3-haloacrylates produce novel plant response effects. Similarly typical aralkyl and araloxyalkyl esters provide these effects such as, for example, β-phenethyl, α-(β-naphthylethyl), benzyl, p-nitrobenzyl, p-chlorobenzyl, 2,4-dichlorobenzyl, 2,4-dichlorophenoxyethyl, 2,4,5-trichlorobenzyl, 2,4,5-trichlorophenoxyethyl and the like esters are effetcive as well as the heterocyclic esters such as the furfuryl, thiophenyl, quinolyl and morpholinyl esters. Still other esters utilizable in our invention include the phosphate esters such as the trialkylphosphate, trialkylthiophosphate, e.g. triethylphosphate, tri-t-butylthiophosphate esters of 3-haloacrylic acid wherein the phosphorus atom is linked to the carbonyl carbon atom of the 3-haloacrylic acid, and wherein the alkyl groups of the phosphate moiety may be substituted with other groups as noted above for the alkyl and aryl esters of 3-haloacrylic acid.

Other derivatives of the carboxylic function of the growth regulant compositions of our invention include those wherein nitrogen-containing groups replace the hydroxyl of the carboxylic acid. Typical examples of such embodiments of the compound of our invention include amide and substituted amide groups. Thus, we can provide N-methyl, N-ethyl, N,N-dimethyl, N,N-diethyl, N-methyl-N-propyl, N-allyl, N,N-diallyl, N-phenyl, N-p-tolyl, N-xylyl, N-methyl-N-phenyl, N-ethyl-N-phenyl, N-benzyl, N-n-butyl, N-hexyl, N-p-chlorophenyl, N-2,4-dichlorophenyl, N-2,4,5-trichlorophenyl, N-pentachlorophenyl, N-p-diphenyl, N-o-diphenyl, N-o-nitrophenyl, N-p-aminophenyl, N-o-dimethylaminophenyl, N-p-tolylsulfonyl, N-p-dimethylammommethylphenyl, N-p-anisyl, N-α-naphthyl, N - β - naphthyl, N-α-(2-aminonaphthyl), N-(p-chlorobenzyl), N-(β-phenethyl), N,N-dibenzyl, N-methyl-N-benzyl, N-(β-hydroxyethyl)-N-benzyl, N-(2,4,5-trichlorophenoxyethyl), N,N-di(2,4 - dichlorophenoxyethyl) and the like, 3-haloacrylamides as well as the unsubstituted acrylamides and N-(3-haloacrylyl) morpholine and similar heterocyclic amides, as well as N-(α-pyridyl), N-(β-pyridyl), N-(γ-pyridyl), N-(α-thiophenyl), N-(β-quinolyl), N-(α-pyridyl)-N-benzyl and the like acrylamides of our invention.

Furthermore, the compounds of our invention comprise the thiolacid derivatives of 3-haloacrylic acid, such as (D) 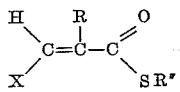

wherein R″ is hydrogen as in the thiolacids or alkyl, cycloalkyl, aryl, alkylaryl, aralkyl, and the like as in the thiol esters. Thus our compounds comprise 3-halothiolacrylic acid as well as, for example, the methyl, ethyl, propyl, isopropyl, butyl, sec.-butyl, isobutyl, ter.-butyl, the isomeric amyl, hexyl, heptyl, octyl, nonyl, decyl, stearyl, lauryl, oleyl, octadecyl, cyclobutyl, cyclopentyl, cyclohexyl, methylcyclopentyl, methylcyclohexyl, dimethylcyclohexyl, isopropylcyclohexyl, benzyl, β-phenethyl, α-phenethyl, α-phenyl-β-chloroethyl, ar.-chlorobenzyl, ar.-nitrobenzyl, phenyl-α-naphthyl, β-naphthyl, p-diphenyl, o-tolyl, m-tolyl, p-tolyl, o-xylyl, 4-ethylphenyl, α-(β-methylnaphthyl), o-chlorophenyl, p-chlorophenyl, 2,4-dichlorophenyl, nitrophenyl, acetophenyl esters thereof and the like. Furthermore, other thiolacid derivatives of our compounds possess growth response characteristics such as, for example, the metallic, ammonium, hydrazonium, and organometallic salts as above.

Still other derivatives of the 3-haloacrylic growth response structure of our invention which have utility in providing phytotoxic responses and are useful as intermediates in further chemical modification include the acid halides, among which the more useful are the chlorides and bromides.

As will be readily observed, the compounds contemplated for use in this invention are capable of existing in two isomeric forms, viz. the cis form and the trans form. Generally, the cis compounds exhibit more pronounced activity and a greater degree of selectivity and are thus preferred for use in our invention, particularly in defoliation.

The compounds used in this invention are known or related to known compounds and can be manufactured by means known to the art, e.g. as taught by Backer et al. in "Les Acides β-Chloroacryliques," Rec. Trav. Chem. 54, 167 (1935), by the addition of a halogen acid to propiolic acid in the presence of water and subsequent separation of cis and trans isomers by fractional crystallization.

A salient feature of this invention resides in the fact that, while the free 3-haloacrylic acid and its salts, such as sodium, potassium or ammonium 3-haloacrylate may be applied directly to the plant surface, derivatives thereof such as the esters and amides are not as effective when so applied but are preferably applied to the soil in which the plant is growing in order to produce the various biological effects aforementioned. In general effective applied concentrations of the esters and amides are substantially higher than those of free 3-chloroacrylic acids or its metal salts. It has been found that defoliating, desiccating, or killing action can be induced in the plants by such soil application, depending on the amount of chemical employed.

While we do not rely on any particular theory underlying the success of our invention, it can be convincingly postulated that the activity of the compounds used in this invention is due to their capacity to yield 3-haloacrylate anions in aqueous medium, which anion may be made available to the plant at the point of application in the case of easily hydrolyzed compounds such as the free acid and its metal salts by formulating such compounds in an aqueous medium, or by applying the more difficultly hydrolyzed compounds to the soil around the base of the plant, whereby such anion is formed, by chemical break-down in the soil during translocation through the soil and/or in subsequent absorbation by the vascular system of the plant. Thus, the esters and amides, which are more difficultly hydrolyzable than the alkali metal salts of 3-haloacrylic acid usually require soil application wherein such ester or amide can be cleaved by hydrolysis, by water in the soil or by aqueous plant juices, and can supply the 3-haloacrylate anions with the concomitant biological effects.

While biological activity of the compounds used in this invention is thus not ascribable to the presence of any particular cation, or ester or amide moiety, it is apparent that there are preferred forms of handling which would dictate, or indicate as preferred, the use of certain forms of the compounds.

In a particularly preferred embodiment of the invention, aqueous formulations of cis-3-chloroacrylic acid or its salts, such as sodium cis-3-chloroacrylate, potassium cis-3-chloroacrylate, ammonium cis-chloroacrylate, etc., are used in defoliatingly effective amounts to achieve defoliation of plants, particularly cotton. These compounds, in addition to being outstandingly effective as cotton defoliants, have a number of desirable characteristics lacking in previously known, including commercially used, defoliants. The compounds used in this invention are not inflammable and thus present no fire hazard, their mammalian toxicity compares favorably with that of known commercial compounds, they possess no disagreeable odor, and are easy to formulate into defoliating compositions. In addition, the efficacy of the present compounds in defoliation is not as dependent on relatively high environmental temperatures as that of known defoliants. While commercial materials such as S,S,S-tributyl phosphorotrithioate, for example, can be efficiently used only at temperatures of 60° C. or higher, the present compounds are effective at 50° C. or even lower temperatures.

In the practice of the various aspects of this invention, the active compounds will generally be admixed with an inert carrier, which may be liquid or solid. In addition, certain well-known conditioning agents may also be incorporated in the formulation to give, for example, a wetting or dispersing effect. Suitable known conditioning agents include alkyl phenyl polyethylene glycol ethers; conventional soaps, such as the water-soluble salts of long chain carboxylic acids; the amino soaps such as the amine salts of long chain carboxylic acids; alkyl aryl sodium sulfonates; the sulfonated animal, vegetable, and mineral oils; quaternary salts of high molecular weight acids; rosin soaps such as salts of abietic acid; sulfuric acid salts of high molecular weight organic compounds; algin soaps, ethylene oxide condensated with fatty acids; alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5.0 percent are found to be optimum. Sticker-spreader agents such as glycerine or non-volatile solid polyethylene glycols may also be added to insure adhesion of the formulation to the plant after spraying.

Suitable liquid carriers comprise water and organic solvents such as acetone, ethanol and the like. As most of the active compounds contemplated for use herein are sufficiently water-soluble to make possible aqueous formulations containing enough dissolved compound to produce the aforementioned variety of biological effects, aqueous solutions with or without conditioning agents provide the most advantageous mode of formulation. Generally, the concentration of active 3-haloacrylic compound in the final formulation will range from about 0.1 percent to about 25 percent, and will more usually be between 0.2 percent and 10.0 percent.

In the preferred practice of this invention water solutions of easily hydrolyzed active compound are prepared and sprayed on the plant which is to be treated. It has been found that the quantity of active compound applied to the plant may vary to some extent, being dependent upon the leaf area and the wettability of the leaf surface. In general, this quantity will be approximately 0.1 to 20 pounds per acre, and preferably from 0.5 to 5 pounds per acre. Useful solutions and formulations are those which contain from 0.05 to 5 percent of the active ingredient, but greater concentrations or more dilute concentrations may be used depending upon the ability of the foliage to retain the formulation. It will be apparent that the concentrations which give the optimum result at lowest cost are those which reach the drip point when the amount deposited on the leaf is the known quantity required to produce the desired extent of defoliation.

In some cases the physical nature of the leaf surface or the nature of the particular compound employed is such as to make liquid spray operations unfeasible or undesirable. In such cases dry pulverulent solid formulations may be used. This type of application generally requires formulation with solid carriers which include the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These solid carriers may represent a substantial portion, for example 50 to 90 percent by weight of the formulation applied to the plant. Here again the precise proportion to be used will depend upon the quantity of active component which will be retained on the leaf surface so as to provide an amount which will produce the optimum result.

It will be understood that, in soil application, the precise concentration of active compound in the formulation is not as important as in leaf application in that the total amount of chemical applied per acre is more significant than the degree of dilution of the applied formulation. It has been found that rates of from about 12 to about 45 pounds per acre result in influencing the growth of the plant. Herbicidal action is generally achieved at rates of about 20 pounds per acre, while defoliating action is effected at somewhat lower rates, e.g. at about 12 pounds per acre. Of course, these rates may be reduced if the formulation is directed at the base of the plant rather than broadcast to cover the whole field evenly.

The following examples are illustrative.

Unless otherwise indicated, the test compounds were formulated by dissolving one gram of compound in 50 milliliters of acetone in which had been dissolved 0.1 gram (10 percent of the weight of the compound) of "Triton X-155," an alkylphenoxy polyethoxyethanol surfactant, as an emulsifying or dispersing agent. The resulting solution was mixed into 200 milliliters of water to give roughly 250 milliliters of a suspension containing the compound in finely divided form. The thus-prepared stock suspension contained 0.4 percent by weight of compound. The test concentrations described hereinbelow were obtained by diluting the stock suspension with water, unless otherwise stated.

EXAMPLE I

The test plants used were two young cotton plants (Gossypium hiosutum L. var. Coker 100) with two secondary leaves fully expanded and third and fourth leaves about to appear.

The test plants were placed on a revolving turntable and sprayed for thirty seconds, using a De Vilbiss spray gun set at 40 p.s.i.g., with test compound formulations containing 2500, 1250, and 625 parts of compound per million parts of formulations, respectively. The sprayed plants were then removed to the greenhouse and held at 80° F. for ten days. After the ten day period, results were observed by rating the degree of defoliation caused by each compound according to the following scheme:

Percent defoliation: Rating
  91–100 _____ 5
  65–78 _____ 4
  39–52 _____ 3
  13–26 _____ 2
  0 _____ 1

Severity of burning or desiccation was rated according to the following designations.

Observed effect: Rating
  Complete desiccation _____ 5
  Severe desiccation _____ 4
  Moderate desiccation _____ 3
  Slight burn _____ 2
  No injury _____ 1

Table I, below sets forth the results of these tests.

Table I

| Compound | Concentration | Defoliation Rating | Desiccation Rating |
| --- | --- | --- | --- |
| Cis-3-chloroacrylic acid | 2,500 | 3 | 5 |
|  | 1,250 | 4 | 3 |
|  | 625 | 5 | -------- |
| Sodium cis-3-chloro-acrylate | 2,500 | 3 | 4 |
|  | 1,250 | 3 | 3 |
|  | 625 | 1 | 3 |
| Ammonium cis-3-chloro-acrylate | 2,500 | 4 | 3 |
|  | 1,250 | 4 | 3 |
|  | 625 | 1 | 3 |
| Potassium cis-3-chloro-acrylate | 2,500 | 4 | 5 |
|  | 1,250 | 4 | 4 |
|  | 625 | 2 | 3 |

EXAMPLE II

Aqueous solutions of cis-3-chloroacrylic acid containing 0.1 percent of a commercial surfactant (Triton X-100) and containing 1.2, 1.8, and 2.4 weight percent of acid, respectively, were sprayed at the indicated rates in pounds per acre on seven-foot square soybean plots containing crabgrass weeds. The soybean plants were three to four inches high and the crabgrass was one-half to one inch high. Application was made using hand sprayers and the test formulation was directed to the base of the soybeans. Application of cis-3-chloroacrylic acid resulted in fair weed control at 5 pounds (1.2 percent solution) and 7.5 pounds (1.8 percent solution) per acre and gave good control at 10 pounds per acre (2.4 percent solution), without phytotoxic effects to the soybeans at any of the three rates used.

EXAMPLE III

The following field tests were carried out to demonstrate the defoliating activity of the compounds used in this invention under actual field conditions. Mature cotton plants with more than 80% of their bolls open growing under normal field conditions in the Southeastern United States were sprayed with aqueous solutions of cis-3-chloroacrylic acid and sodium cis-3-chloroacrylate to give the indicated rates in pounds per acre. Per cent defoliation was determined by actual leaf count at the indicated times after application of compound. The results of this test are set forth in Table II below.

Table II

| Compound | Concentration of Compound in Solution (weight percent) | Application Rate (pounds per acre) | Percent defoliation [1] | |
|---|---|---|---|---|
| | | | 9 days | 14 days |
| Cis-3-chloroacrylic acid | 0.91 | 1.50 | 88.7 | 90 |
| | 1.04 | 1.75 | 93.0 | 94 |
| | 1.21 | 2.00 | 91.3 | 91.3 |
| Sodium cis-3-chloroacrylate | 0.91 | 1.5 | 90 | 93 |
| | 1.21 | 2.0 | 89.7 | 92 |

[1] Each figure represents an average of at least three replications, one replication consisting of a ten-foot row.

EXAMPLE IV

To illustrate the systemic herbicidal action of compounds representative of this invention, a six-inch high chrysanthemum plant (Chrysanthemum sp.) growing in a four-inch clay pot (one plant per test chemical) was treated as follows. The soil in each pot was drenched with 50 milliliters of test compound formulation obtained by diluting the above-described stock suspension with water to 2500 parts per million. The pots were removed to the greenhouse and the plants cared for in the usual fashion for seven to nine days after application of chemical, at which time phytotoxic results were observed and designated as follows.

5=plant dead
4=severe injury
3=moderate injury
2=slight injury
1=no injury (same as untreated control plants The results of these tests are set forth in Table III below.

Table III

| Compound: | Rating |
|---|---|
| Cis-3-chloroacrylic acid | 5 |
| Trans-3-chloroacrylic acid | 5 |
| Cis-3-chloroacrylamide | 5 |
| Trans-3-chloroacrylamide | 1 [3] |
| Methyl trans-3-chloroacrylate | 2 [4] |
| Methyl cis-3-chloroacrylate | 5 |

[1] Plant was burned.
[2] Plant was wilted.

EXAMPLE V

Compounds representative of this invention were tested with regard to pre-emergence herbicidal activity, i.e. their ability to inhibit seed germination, by the following test.

Two seed-soil mixtures were prepared, the first by mixing 53 cubic centimeters of perennial ryegrass seed (*Lolium perenne*) and 27 cubic centimeters of Florida broadleaf mustard seed (*Brassica pincea* var. *foliosa*) with 6100 cubic centimeters of sifted, fairly dry soil, the second by mixing 31 cubic centimeters of golden millet seeds (*Setaria italica* var. *stramineofructa*) and 12 cubic centimeters of redroot seeds (*Amaranthus retroflexus*) with 6100 cubic centimeters of sifted, fairly dry soil. Each of the said two mixtures was rolled separately on a ball mill for about one-half hour to insure uniform mixing of sand and soil, and, for each chemical to be tested, a three-inch pot was filled with each of the mixtures, and the pots removed to the greenhouse and watered lightly.

About two hours after such planting, 25 milliliters of test solution obtained by diluting the afore-described stock suspension to 1000 parts per million with water was added to each of two pots containing the two separate mixtures. A control test, carried out as above but without addition of test compound, was also performed. The pots were held in the greenhouse and watered lightly for three weeks at which time observations were made as to the extent of injury of each plant species and each test compound was rated according to the following designations.

5=no seedlings emerged
4=few seedlings emerged
3=moderate reduction in stand
2=slight reduction in stand
1=no injury; seedlings appear no different with respect to stand or growth than control.

The results of these tests are set forth in Table IV below.

Table IV

| Compound | Rating | | | |
|---|---|---|---|---|
| | Rye | Millet | Red Root | Mustard |
| Cis-3-chloroacrylic acid | | 1 [3] | 1 [3] | 1 [3] |
| Trans-3-chloroacrylic acid | 1 [3] | 1 [4] | 5 | 1 [4] |
| Cis-3-chloroacrylamide | | 1 [3] | | 1 [3] |
| Trans-3-chloroacrylamide | 3 | 1 [3] | 1 [3] | 5 |
| N,N-diallyl-cis-3-chloroacrylamide | | | 3 | |
| Methyl trans-3-chloroacrylate | | | 1 [3] | |

[1] In these tests, the seedlings that did emerge were stunted.

EXAMPLE VI

Privet plants (*Ligustrum vulgare*) as representative hardwoods, were placed on a revolving turntable and sprayed to drip with an aqueous solution containing 5000 parts by weight of sodium cis-3-chloroacrylate per million parts of solution. The plants were then removed to the greenhouse and held at 80° F. About one month after application of the chemical the plants were examined and it was found that the plant leaves were moderately defoliated and desiccated. The plants were not killed, however, as evidenced by the fact that the terminal buds remained green and began to grow approximately two months after treatment.

EXAMPLE VII

Aqueous solutions of cis-3-chloroacrylic acid and 2-butoxyethyl cis-3-chloroacrylate were applied to the soil in which cotton plants, variety Coker 100, in the four to six leaf stage, were growing (two plants per compound per concentration used) to give the indicated rates in pounds per acre. Two weeks after treatment the plants were examined and rated with regard to phytotoxic effects according to the scheme of Example IV. The results are set forth in Table V, below.

Table V

| Compound | Rate (pounds per acre) | Phytotoxicity Rating |
|---|---|---|
| Cis-3-chloroacrylic acid | 50 | 5 |
| | 25 | 5 |
| | 12 | 2 |
| | 6 | 1 |
| 2-butoxyethyl cis-3-chloroacrylate | 50 | 5 |
| | 25 | 5 |
| | 12 | 2 |
| | 6 | 1 |

EXAMPLE VIII

Aqueous solutions of 2-methyl-cis-3-chloroacrylic acid were sprayed to cover evenly a nine square foot area in which were growing Tendergreen beans with their first trifoliate just beginning to expand and cotton plants in the four to six leaf stage, for each of the indicated rates in pounds per acre (3 plants per treatment). Seven days after treatment, the plants were examined and it was noted that, at ½, 2, and 4 pounds per acre, the cotton plants were moderately defoliated and desiccated, and that, at 2 and 4 pounds per acre, the bean plants were moderately defoliated and desiccated. Thirteen days after application, the cotton plants were found to be 83 percent defoliated at the four pound per acre rate.

What is claimed is:

1. The method of controlling the growth of and defoliating plants which comprises bringing into association with the plants, in an amount sufficient to control and defoliate, a 3-haloacrylic compound selected from the group consisting of 3-haloacrylic acid and hydrolyzable salts, esters, and amides thereof where the halogen substituent in said 3-haloacrylic compound is selected from the group consisting of chlorine and bromine.

2. The method of controlling the growth of plants which comprises bringing into association with the plants, in phototoxic amounts, a 3-haloacrylic compound selected from the group consisting of 3-haloacrylic acid and hydrolyzable salts, esters, and amides thereof where the halogen substituent in said 3-haloacrylic compound is selected from the group consisting of chlorine and bromine.

3. The method of desiccating plants which comprises bringing into association with the plants, in desiccatingly effective amounts, a 3-haloacrylic compound selected from the group consisting of 3-haloacrylic acid and hydrolyzable salts, esters, and amides thereof where the halogen substituent in said 3-haloacrylic compound is selected from the group consisting of chlorine and bromine.

4. The method of defoliating plants which comprises bringing into association with the plants, in defoliatingly effective amounts, a hydrolyzable salt of cis-3-chloroacrylic acid.

5. The method of defoliating plants which comprises bringing into association with the plants, in defoliatingly effective amounts, a hydrolyzable ester of cis-3-chloroacrylic acid.

6. The method of defoliating plants which comprises bringing into association with the plants, in defoliatingly effective amounts, a hydrolyzable amide of cis-3-chloroacrylic acid.

7. The method for defoliating plants which comprises applying to said plants a defoliatingly effective amount of cis-3-chloroacrylic acid.

8. The method for defoliating plants which comprises applying to said plants a defoliatingly effective amount of sodium cis-3-chloroacrylate.

9. The method for defoliating plants which comprises applying to said plants a defoliatingly effective amount of potassium cis-3-chloroacrylate.

10. The method for defoliating plants which comprises applying to said plants a defoliatingly effective amount of ammonium cis-3-chloroacrylate.

11. The method of defoliating plants which comprises bringing into association with the plants in defoliatingly effective amounts, 2-methyl-cis-3-chloroacrylic acid.

12. The method of defoliating plants which comprises bringing into association with the plants in defoliatingly effective amounts, a hydrolyzable salt of 2-methyl-cis-3-chloroacrylic acid.

13. The method of desiccating plants which comprises bringing into association with the plants, in desiccatingly effective amounts, a hydrolyzable salt of cis-3-chloroacrylic acid.

14. The method of desiccating plants which comprises bringing into association with the plants, in desiccatingly effective amounts, a hydrolyzable ester of cis-3-chloroacrylic acid.

15. The method of desiccating plants which comprises bringing into association with the plants in desiccatingly effective amounts, cis-3-chloroacrylic acid.

16. The method of desiccating plants which comprises bringing into association with the plants in desiccatingly effective amounts, sodium cis-3-chloroacrylate.

17. The method of desiccating plants which comprises bringing into association with the plants in desiccatingly effective amounts, ammonium cis-3-chloroacrylate.

18. The method of desiccating plants which comprises bringing into association with the plants in desiccatingly effective amounts, 2-methyl-cis-3-chloroacrylic acid.

19. The method of desiccating plants which comprises bringing into association with the plants in desiccatingly effective amounts, a hydrolyzable salt of 2-methyl-cis-3-chloroacrylic acid.

References Cited by the Examiner
UNITED STATES PATENTS

| | | | |
|---|---|---|---|
| 2,618,545 | 11/1952 | Newcomer et al. | 71—2.7 |
| 2,761,875 | 9/1956 | Stoner | 71—2.7 X |
| 3,040,086 | 6/1962 | Miller | 71—2.7 X |

OTHER REFERENCES

Backer et al.: Rec. Trav. Chem. 54, 167–170, 1935.

Yasnitskii et al.: Chemical Abstracts, vol. 51, col. 14788(e) (1957).

LEWIS GOTTS, *Primary Examiner.*

MAURICE A. BRINDISI, *Examiner.*